US012717022B2

(12) United States Patent
Lehner et al.

(10) Patent No.: US 12,717,022 B2
(45) Date of Patent: Aug. 25, 2026

(54) METHOD FOR PROBING A SUBSURFACE STRUCTURE

(71) Applicant: PROCEQ SA, Schwerzenbach (CH)

(72) Inventors: Samuel Lehner, Zürich (CH); Marcel Poser, Oberuzwil (CH)

(73) Assignee: PROCEQ SA, Schwerzenbach (CH)

( * ) Notice: Subject to any disclaimer, the term of this patent is extended or adjusted under 35 U.S.C. 154(b) by 187 days.

(21) Appl. No.: 18/692,430

(22) PCT Filed: Sep. 17, 2021

(86) PCT No.: PCT/EP2021/075712
§ 371 (c)(1),
(2) Date: Mar. 15, 2024

(87) PCT Pub. No.: WO2023/041176
PCT Pub. Date: Mar. 23, 2023

(65) Prior Publication Data

US 2025/0138182 A1 May 1, 2025

(51) Int. Cl.
*G01S 13/88* (2006.01)
*G01S 7/35* (2006.01)

(52) U.S. Cl.
CPC ............ *G01S 13/885* (2013.01); *G01S 7/356* (2021.05)

(58) Field of Classification Search
CPC ........ G01S 13/885; G01S 7/354; G01S 7/356; G01S 13/38; G01V 3/12
See application file for complete search history.

(56) References Cited

U.S. PATENT DOCUMENTS 6,445,334 B1 * 9/2002 Bradley .................. G01S 13/90 342/195
7,436,911 B2 * 10/2008 Fudge ................ H04B 1/71637 375/340

(Continued)

FOREIGN PATENT DOCUMENTS

CN 107045148 8/2017
EP 1 935 156 2/2012

(Continued)

OTHER PUBLICATIONS

Japan Office Action conducted in counterpart Japan Appln. No. 2024-516848 (Jul. 22, 2025).

(Continued)

*Primary Examiner* — Peter M Bythrow
(74) *Attorney, Agent, or Firm* — GREENBLUM & BERNSTEIN, P.L.C.

(57) ABSTRACT

The invention relates to a method and a device for probing a subsurface structure. The method comprises the steps of (a) sending a probe signal as an electromagnetic wave into the structure, (b) receiving an echo signal of the electromagnetic wave from the structure, and (c) processing the echo signal for deriving information about the structure. The step (c) of processing the echo signal comprises sampling the echo signal at a sampling frequency $f_s$. The probe signal comprises multiple discrete frequency components $f_{n,k}$, wherein at least two of the multiple frequency components $f_{n,k}$ are located in different Nyquist zones. An n-th Nyquist zone covers a frequency range from $(n-1)*Tf_s/2$ to $n*f_s/2$ with $f_s$ being the sampling frequency and n=1, 2 . . . . Further, k=1 . . . K and K is the number of frequency components $f_{n,k}$ in the n-th Nyquist zone. The method and device facilitate an increase in data acquisition speed without losing information on any of the frequency components.

23 Claims, 4 Drawing Sheets

(56) References Cited

U.S. PATENT DOCUMENTS 8,660,218 B2 * 2/2014 Maleh .................... G01R 23/16 375/350
8,687,736 B1 * 4/2014 Huynh ................... H03D 3/007 375/322
9,397,870 B2 * 7/2016 Kwon ..................... H04L 27/22
9,864,045 B2 * 1/2018 Fairley .................... G01S 13/44
10,871,561 B2 * 12/2020 Fox ......................... G01S 7/025
2002/0122000 A1 9/2002 Bradley et al.
2007/0081578 A1 4/2007 Fudge et al.
2007/0086544 A1 4/2007 Fudge et al.
2008/0013653 A1 1/2008 Fudge et al.
2015/0293209 A1 10/2015 Fairley
2018/0252807 A1 9/2018 Fox
2020/0072813 A1 * 3/2020 Lehner .................... G01S 13/88
2022/0365172 A1 * 11/2022 Dandrow ................ G01S 13/86
2023/0194698 A1 * 6/2023 Cornic .................. G01S 13/428 342/107

FOREIGN PATENT DOCUMENTS

EP 2 904 419 8/2021
FR 3 109 825 5/2022
JP 2016-217834 12/2016
JP 2020-511647 4/2020
JP 2020-085871 6/2020
WO 2007/047248 4/2007
WO 2014/057234 4/2014
WO 2016/153914 9/2016
WO 2018/161183 9/2018

OTHER PUBLICATIONS

Ayhan et al., "A method for using sub-nyquist sampling for ultra low-power positioning systems," SiPS 2013 Proceedings, 2013 IEEE Workshop on Signal Processing Systems, ISBN: 978-1-4673-6238-2, pp. 100-105 (Dec. 2, 2013).
Skolnik, "Radar Handbook, Third edition", McGraw Hill, USA, XP055317593, ISBN: 978-0-07-148547-0, Jan. 1, 2008, pp. 6.1-6.47 and 21-21.49.
Int'l Search Report (Form PCT/ISA/210) conducted in Int'l Appln. No. PCT/EP2021/075712 (May 25, 2022).
Int'l Written Opinion (Form PCT/ISA/237) conducted in Int'l Appln. No. PCT/EP2021/075712 (May 25, 2022).
Korea Office Action conducted in counterpart Korea Appln. No. 10-2024-7012285 (Mar. 8, 2026).
Kester, "Undersampling Applications," Practical Analog Design Techniques, Section 5 (Dec. 31, 1995).
Europe Communication (Intent to Grant) issued in counterpart Europe Appln. No. 21 778 444.6 (Apr. 21, 2026).

* cited by examiner

METHOD FOR PROBING A SUBSURFACE STRUCTURE

TECHNICAL FIELD

The invention relates to a method for probing a subsurface structure and to a device for probing a subsurface structure.

BACKGROUND ART

Electromagnetic waves are routinely used for probing a subsurface structure such as a man-made structure or the underground. Ground penetrating radar (GPR) is a technique often applied in geophysical surveys or in nondestructive testing, e.g. of concrete structures, which employs electromagnetic waves, usually in the range from 10 MHz to 3.4 GHz.

A known method for GPR data acquisition is stepped-frequency continuous wave (SFCW). A schematic diagram of the frequency f vs. time t characteristic of SFCW probe signals is shown in FIG. 1*a*. Instead of sending a single broadband pulse or a continuous probe signal with a fixed frequency, SFCW uses continuous-wave probe signals of duration ts with a frequency that is changed over time or between subsequent probe signals, in particular in steps of Δf. Subsequent probe signals, e.g. ranging from 400 MHz to 3.4 GHz, make up a sweep of probe signals. An example of the SFCW method and a suitable device are described in WO 2018/161183 A1.

An echo of an SFCW electromagnetic wave that is reflected in the subsurface structure is received by an antenna and processed in order to retrieve information about the subsurface structure. Such information may be a presence, location and/or property of discontinuities in the subsurface structure, such as e.g. a rebar in concrete, a defect in a building structure, a pipe or a geological layer in the soil. In particular, an A-scan, i.e. an amplitude vs. time plot of the echo, as it would be received in response to a broadband impulse, may be reconstructed from the echo of the SFCW probe signal and then evaluated in terms of information about the subsurface structure.

SFCW methods are advantageous in terms of data quality and thus quality of the resulting image of the subsurface structure, in particular in terms of signal-to-noise ratio (SNR) and resolution, while maintaining a large penetration depth of the electromagnetic waves and thus facilitating a large probing depth.

On the other hand, the acquisition speed of conventional SFCW methods is limited, meaning that GPR measurements of a defined resolution. e.g. 2 cm, may only be obtained if the GPR device does not move faster relative to the subsurface than a maximum acquisition speed which conventionally is of the order of e.g. 10 to 20 km/h. Further, conventional SFCW methods suffer from regulatory limitations due to their sweep through a wide range of frequencies.

DISCLOSURE OF THE INVENTION

It is therefore a general object of the present invention to provide a method and a device for probing a subsurface structure which facilitates acquiring high-resolution data, in particular with a resolution of 50 mm or better, at a high measurement velocity, in particular of 50 to 80 km/h or more. Advantageously, such method and device for probing a subsurface structure is in accordance with regulatory requirements, such as e.g. regulation of the Federal Communications Commission (FCC).

The features described below with regard to the method are meant to also pertain to the device and vice versa. Further, described features are meant to be disclosed independently from each other and in combination where reasonable.

Method for Probing a Subsurface Structure

In order to implement the above and still further objects of the invention, which will become more readily apparent in the following description, the method for probing the subsurface structure, e.g. a man-made structure or the underground, comprises the following steps:

(a) sending a probe signal as an electromagnetic wave into the structure: The electromagnetic wave may be polarized. e.g. linearly polarized. The step of sending the electromagnetic wave into the structure is in particular performed by means of an antenna.

(b) receiving an echo signal of the electromagnetic wave from the structure: Advantageously, a part of the wave sent into the structure is reflected by an internal feature of the structure, which feature is characterized by a change of electrical properties, e.g. a change of a permittivity. The reflected part of the wave may be received as the echo signal, i.e. a reflected electromagnetic wave, from the structure, in particular by means of another or the antenna.

(c) processing the echo signal for deriving information about the structure: The information derived may relate to the internal feature of the structure. The internal feature may e.g. be a location and/or gradient of an internal boundary within the structure, a characterization of a scatterer or reflector, an amount of change of an electrical property, e.g. of a permittivity, at a certain location in the structure, etc., see also the above section on Background Art.

The step (c) of processing the echo signal comprises sampling the echo signal at a sampling frequency $f_s$. By sampling, in particular, the echo signal, which is received as an analog signal and may be pre-processed in the analog domain, is digitized at the sampling frequency $f_s$. Sampling is advantageously performed by an analog-to-digital converter (ADC). ADCs typically are limited in terms of a maximum possible sampling frequency and in terms of analog bandwidth. ADCs with a large analog bandwidth, such as e.g. 500 MHz and larger, are typically either complex and expensive or have a bad performance in terms of SNR and output signal resolution.

In general, only frequency components of a signal with frequencies up to the Nyquist frequency $f_s/2$ can be recovered unambiguously after sampling the signal at the sampling frequency $f_s$. Above the Nyquist frequency, aliasing occurs, meaning that frequency components with frequencies of $f_s/2$ or larger are folded down into the range of frequencies between 0 and $f_s/2$. In connection with the limited capabilities of ADCs (as described above), the limitation of the Nyquist frequency makes it difficult to use ultra-wideband (UWB) signals, i.e. in particular signals with a bandwidth of 500 MHz or more, also in GPR applications. In order to overcome this limitation, the method has the following features:

The probe signal comprises multiple discrete frequency components $f_{n,k}$, in particular the probe signal consists of the multiple discrete frequency components $f_{n,k}$. A frequency component $f_{n,k}$ in particular is characterized by its frequency and an amplitude and phase. Alternatively, the amplitude and phase may be expressed as a complex amplitude. Advantageously, all frequency components in the probe signal other than the multiple discrete frequency components $f_{n,k}$ are zero, i.e. in particular all frequency components other than the $f_{n,k}$ have an amplitude of at most 50%, in particular at most 25% or at most 10%, of a maximum amplitude of the $f_{n,k}$.

Further, at least two of the multiple frequency components $f_{n,k}$ are located in different Nyquist zones. An n-th Nyquist zone covers a frequency range from $(n-1)*f_s/2$ to $n*f_s/2$ with $f_s$ being the sampling frequency and n=1.2 . . . . Strictly speaking, the n-th Nyquist zone in particular does not comprise its upper limit $n*f_s/2$. Further, k=1 . . . . K and K is the number of frequency components in the n-th Nyquist zone. K may be zero for some Nyquist zones and in particular K is zero for all Nyquist zones above an N-th Nyquist zone, in which the $f_{n,k}$ with largest frequency is located.

In an embodiment, the multiple discrete frequency components $f_{n,k}$ span a bandwidth of the probe signal. According to the above-said, the bandwidth of the probe signal may be wider than a Nyquist zone, in particular larger than $f_s/2$. Advantageously, the bandwidth of the probe signal is at least 500 MHz, in particular at least 1 GHz. Such use of a UWB signal facilitates compliance with regulatory limitations, such as FCC regulation, and a fast data acquisition speed, see below.

Further advantageously, the sampling frequency $f_s$ is between 100 and 500 MHz, in particular between 200 and 300 MHz, e.g. 250 MHz. In the latter case, the $1^{st}$ Nyquist zone is from 0 to 125 MHz. As a consequence, for a bandwidth of 500 MHz or 1 GHz, four or, respectively, eight Nyquist zones need to be exploited (N=4 or, respectively N=8). Such values of sampling frequency and analog input bandwidth are achievable with conventional ADCs, thus making the implementation of the method feasible for practice and reasonable in price.

As discussed before, only frequency components $f_{1,k}$, i.e. within the $1^{st}$ Nyquist zone, with frequencies of less than $f_s/2$, are recoverable without aliasing. In general, the frequency components $f_{n,k}$ in the n-th Nyquist zone fold onto folded frequency components $f'_{n,k}$ in the $1^{st}$ Nyquist zone. The frequency of the $f'_{n,k}$ may be expressed as $$f'_{n,k} = \begin{cases} f_{n,k}\mathrm{mod}(f_s/2), & n \text{ odd} \\ f_s/2 - f_{n,k}\mathrm{mod}(f_s/2), & n \text{ even} \end{cases}$$

Advantageously, the $f_{n,k}$ are such that for all n and k, the $f'_{n,k}$ differ from each other. In other words, each of the multiple discrete frequency components $f_{n,k}$ present in the (analog) echo signal maps (in the digital signal after sampling) onto a folded frequency component $f'_{n,k}$ in the $1^{st}$ Nyquist zone that is different and in particular distinguishable from the other $f'_{n,k}$. In this way, frequency components from more than one Nyquist zone, meaning a larger bandwidth, may be used to probe the subsurface structure, while keeping the requirements for the ADC, in particular regarding $f_s$, constant. This allows to use a conventional and reasonably priced ADC together with a UWB signal. Using a UWB signal instead of a single-frequency probe signal, in turn, facilitates compliance with regulatory limitations, such as FCC regulation.

Remark: The frequencies of the frequency components in the echo signal received from the structure are assumed to be essentially the same as the frequencies of the frequency components $f_{n,k}$ in the probe signal sent into the structure. In particular, nonlinear effects such as frequency shifting are usually negligible.

A further advantage of the above condition of distinct $f'_{n,k}$ after sampling is a high possible acquisition speed. Since multiple frequency components are sent simultaneously—instead of one at a time as in conventional SFCW methods—, the acquisition speed is larger, in particular by a factor equal to a number M of frequency components sent simultaneously. This facilitates acquisition speeds up to e.g. 50 or 80 km/h at a spatial resolution of 50 mm, in particular 25 mm, or better. Thus, a GPR device carrying out the above method may conveniently be mounted to a car, making GPR data acquisition more efficient.

In an embodiment, K>1, in particular K>10 or K>20, for at least one Nyquist zone and in particular for all Nyquist zones with n=1 . . . N with N being at: least 2. Further, the frequency components $f_{n,k}$ are advantageously located in Nyquist zones up to the N-th Nyquist zone, wherein N>2. In particular. N may be at least 4 or at least 6 or at least 8. In case that K frequency components are located in every Nyquist zone up to the N-th Nyquist zone, the number of frequency components is N*K, thus in particular making data acquisition faster by a factor of up to N*K.

Further, the probe signal may comprise at least M discrete frequency components $f_{n,k}$, wherein M is at least 10, in particular 100 or at least 200. If a distribution of the frequency components over the first N Nyquist zones is equal, then M is approximately N*K, approximately in particular implying deviations of up to +/−N.

Advantageous Conditions on the $f_{n,k}$

In an embodiment, the frequency components $f_{n,k}$ are equally spaced in frequency space, in particular by a frequency spacing (Δf) between adjacent $f_{n,k}$. The frequency spacing may e.g. be between 0.1 and 100 MHz, in particular between 1 and 10 MHz. The equal spacing of the frequency components $f_{n,k}$ allows a simple data processing, in particular applying conventional SFCW processing algorithms. In case of an equal spacing of the $f_{n,k}$ in frequency space, the sampling frequency $f_s$ may not be a multiple of the frequency spacing Δf in order to achieve distinct $f'_{n,k}$ after sampling. In general, suitable $f_{n,k}$ may e.g. be found empirically. Examples are described below with respect to the figures.

Advantageously, the frequency components $f_{n,k}$ are such that for all n and k, the folded frequency components $f'_{n,k}$ have a minimum distance Δf' to each other which is at least $1/t_0$ with $t_0$ being a duration of the probe signal. Such condition on the minimum distance Δf' between the $f'_{n,k}$ makes sure that the $f'_{n,k}$ are distinguishable. Thus, the discrete frequency components $f_{n,k}$, in particular their amplitudes and phases, may be determined unambiguously.

As an example for a typical ADC, e.g. with sampling frequency $f_s$=250 MHz: For a probe signal duration $t_0$=2 μs, the folded frequency components $f'_{n,k}$ need to have a minimum distance Δf' of at least 0.5 MHz in order to be resolvable as distinct frequency components. If the minimum distance Δf' is to be lowered, the probe signal duration $t_0$ (and thus the echo signal duration) needs to be increased.

In an embodiment, the frequency components $f_{n,k}$ are such that for all n and k, the folded frequency components $f'_{n,k}$ have a minimum distance Δf' to each other which is at least 0.1 MHz, in particular at least 0.4 or at least 0.7 MHz. As exemplified above, such choice of frequencies allows to use a reasonably short probe signal duration and thus to reach a high acquisition speed.

Further advantageously, the frequency components $f_{n,k}$ are such that for all n and k, the folded frequency components $f'_{n,k}$ have a minimum distance Δf' to each other which is at least $f_s/(4*M)$, in particular at least $f_s/(4*N*K)$ when applying the above assumption that M is approximately N*K. Such condition on the minimum distance Δf' means that the $f'_{n,k}$ are essentially equally spaced within the 1st Nyquist zone, with the value of the minimum distance Δf' amounting to 50% of a theoretical distance between the $f'_{n,k}$ if all M folded frequency components $f'_{n,k}$ would be equally spaced in the 1st Nyquist zone, i.e. in the frequency range from 0 to $f_s/2$.

Processing the Echo Signal

In an embodiment, the step (c) of processing the echo signal comprises performing a spectral analysis, in particular a Fourier analysis, of the echo signal. This is advantageously done in the digital domain, i.e. in particular after sampling the (analog) echo signal.

Advantageously, the step (c) of processing the echo signal comprises determining a quantity indicative of an amplitude and/or a phase of each of the folded frequency components $f'_{n,k}$ in the echo signal. Such quantity may e.g. be directly the amplitude and/or the phase of the echo signal, or a complex Fourier coefficient for each $f'_{n,k}$. In particular, the quantity indicative of the amplitude and/or phase of the frequency components is then further processed for deriving information about the subsurface structure, e.g. by means of conventional SFCW algorithms. However, such quantity first needs to be attributed to the corresponding frequencies of the (unfolded) discrete frequency components $f_{n,k}$ in the echo signal (before sampling).

Hence, the step (c) of processing the echo signal advantageously comprises attributing the folded frequency components $f'_{n,k}$ to the corresponding discrete frequency components $f_{n,k}$. Such attribution is possible with the above relationship between $f'_{n,k}$ and $f_{n,k}$ because the frequencies of the $f_{n,k}$ present in the probe signal are known and because they map on differing $f'_{n,k}$.

For frequency components $f_{n,k}$ with even-numbered n, a further step may be necessary: Advantageously, the step (c) of processing the echo signal comprises conjugating the quantity indicative of an amplitude and/or a phase for these frequency components. In particular, this may comprise conjugating the complex Fourier coefficients of the frequency components $f_{n,k}$ with even-numbered n. Such conjugating operation is necessary in order to reverse the conjugation of the quantity upon folding into the 1st Nyquist zone.

Non-Zero Initial Phase Shift

Sending a probe signal comprising a multitude of frequency components $f_{n,k}$ without further measures may lead to a high peak transmitting power. This is due to the fact that, at certain times, peaks of periodic functions, in particular having equally spaced frequencies, with zero initial phase shift will add up constructively and thus generate a high cumulative signal. The "initial phase shift" may be defined as phase difference between a zero-phase of the lower-frequency function and a closest zero-phase of the higher-frequency function. In the device for probing the subsurface structure, the frontend, i.e. the antenna plus analog components for processing the received signal, as well as a probe signal generator for generating the probe signals and an echo signal processor for processing the echo signals have to be adapted to handle the peak transmitting power. For reasons of signal-to-noise ratio and low intermodulation, it is thus undesired to have a high peak transmitting power which is much larger than an average transmitting power.

Therefore, in an advantageous embodiment, at least two of the frequency components $f_{n,k}$ have a non-zero initial phase shift. In particular, the initial phase shift of the at least two spectral components is such that a maximum amplitude of the probe signal is smaller than a maximum amplitude of a hypothetic probe signal with the (same) frequency components but zero initial phase shift of the frequency components, in particular smaller by at least 10%, at least 25% or at least 50%. This allows to keep the peak transmitting power low, in particular not much larger, e.g. only a factor of 2 or 3, than the average transmitting power. Thus, a good signal-to-noise ratio and a low intermodulation may be achieved.

In practice, initial phase shifts fulfilling the above condition for a given number of frequency components $f_{n,k}$ may be obtained by an empirical approach, e.g. in a numerical simulation: The frequency components are added up with random initial phase shifts, thus generating a test probe signal. Then a ratio of the maximum of the test probe signal to an average of the test probe signal is derived. These two steps are iterated with different random initial phase shifts, thus forming a set of test probe signals. For the actual application in probing the subsurface structure, the test probe signal with the smallest ratio is chosen. In this approach, the initial phase shifts may be derived from a random number generator, but then, they are not changed in the application. In particular, the initial phase shift of the at least two frequency components may be constant, i.e. the same, for each probe signal.

Evidently, the (known) initial phase shift of the discrete frequency components $f_{n,k}$ needs to be accounted for in the processing: Advantageously, the step (c) of processing the echo signal comprises correcting the phase of the at least two discrete frequency components $f_{n,k}$ by the initial phase shift.

Similar to the initial phase shifts, a frequency of the discrete frequency components $f_{n,k}$ may be offset by frequency offsets $\theta_{n,k}$. Applying different $\theta_{n,k}$ to different frequency components $f_{n,k}$ may reduce an overall cycle time, i.e. an overall periodicity, of the probe signal compared to the case of a constant frequency spacing Δf between neighboring frequencies. However, the frequency offsets $\theta_{n,k}$ should not be too large, e.g. be bounded by an interval $(-0.5,+0.5)\times\Delta f$ in order not to overlap with a neighboring frequency. In particular, all frequency offsets $\theta_{n,k}$ may be the same, $\theta_{n,k}=\theta$.

Advantageously, the frequency offset $\theta_{n,k}$ is the same for all probe signals in one cycle. Different $\theta_{n,k}$ may be applied to different cycles to reduce an overall cycle time. A further advantage of applying different frequency offsets to different cycles is a reduction of measurement errors due to spurious signals. Since such errors differ when varying the frequency offset, averaging over different cycles may compensate such errors.

Sweep of Probe Signals

Similar to a conventional SFCW signal, probe signals with the above properties and varying frequency components $f_{n,k}$ may be strung together in order to form a sweep of probe signals that covers a large range of frequencies, e.g. between 40 MHz and 3 GHz.

Accordingly, in an embodiment, the steps (a), (b) and (c) of the above method are iterated with varying discrete frequency components $f_{n,k}$ in the probe signal. Between subsequent iterations, the discrete frequency components $f_{n,k}$ in the probe signal are shifted by a frequency offset, which may be a constant. In particular, the frequency offset may be equal to or larger than the bandwidth.

Advantageously, the probe signals of the subsequent iterations span a total bandwidth of at least 1 GHz, in particular at least 2 GHz or at least 3 GHz. The total bandwidth may in particular be defined as the frequency range spanned by the lowest-frequency components and the highest-frequency component. In particular, the total bandwidth may cover at least frequencies between 40 MHz and 3 GHz, which yields high-resolution and high-penetration-depth radar data for many geological and NDT applications.

As an example, a sweep of probe signals may comprise three subsequent probe signals: A first probe signal with frequency components $f_{n,k}$ covering frequencies between 40 MHz and 1 GHz, a second probe signal with $f_{n,k}$ covering a range between 1 and 2 GHz. and a third probe signal with $f_{n,k}$ covering a range between 2 and 3 GHz.

In case of a sweep of probe signals, it may be advantageous that the step (c) of processing the echo signal, at least for part of the subsequent probe signals, comprises down-mixing the echo signal with a local oscillator signal. This should in particular be done before performing the spectral analysis of the echo signal, i.e. still in the analog domain. In line with the above example values, the local oscillator signal may e.g. have a frequency between 1 and 2 GHz, in particular a first local oscillator at 1 GHz and a second local oscillator at 2 GHz.

By down-mixing the echo signal before sampling it, the requirements on subsequent components and in particular on the ADC, may be relieved: A specified input bandwidth of the ADC does not need to cover the total bandwidth of the sweep of probe signals. But, advantageously, the input bandwidth of the ADC covers the bandwidth of one probe signal.

Device for Probing a Subsurface Structure

A second aspect of the present invention relates to a device for probing a subsurface structure comprising the following components:

- a probe signal generator configured to generate a probe signal, in particular the probe signal with any of the above properties: Advantageously, the probe signal generator comprises a digital signal generator and a digital-to-analog converter (DAC). Further, the probe signal generator is configured to generate a probe signal comprising multiple discrete frequency components $f_{n,k}$. Advantageously, a frequency resolution of the probe signal generator 0.1 MHz or less;
- a transmit antenna configured to send the probe signal as an electromagnetic wave into the structure;
- a receive antenna configured to receive an echo signal of the electromagnetic wave from the structure: The transmit antenna and the receive antenna may each comprise a lower-frequency subantenna and a higher-frequency subantenna. A center frequency of the lower-frequency subantenna may e.g. be between 300 and 500 MHz, in particular around 380 MHz. A center frequency of the higher-frequency subantenna may e.g. be between 1 and 1.5 GHz, in particular around 1.2 GHz;
- an echo signal processor configured to process the echo signal for deriving information about the structure: Advantageously, the echo signal processor comprises an analog part, a digital part and an analog-to-digital converter (ADC) configured to sample the echo signal at a sampling frequency $f_s$. In agreement with the above method, the sampling frequency $f_s$ in particular is smaller than two times the bandwidth of the probe signal.

Further, the device is advantageously configured to carry out the above-described method.

In an embodiment, the echo signal processor, in the analog part, comprises a local oscillator and a down-mixer configured to down-mix the echo signal with a local oscillator signal from the local oscillator. As explained before, this has the effect that an input bandwidth of the ADC, in case of a sweep of multiple probe signals, does not need to cover the total bandwidth of the sweep, but only the bandwidth of one probe signal.

Further, the local oscillator may comprise at least two switchable analog oscillators. In particular, for a first part of the probe signals, a first of the analog oscillators may be used as local oscillator; for a second part of the probe signals, a second of the analog oscillators may be used as local oscillator; and for a third part of the probe signals, no down-mixing may be necessary, meaning that the down-mixer may be shortcut. In case of a lower-frequency subantenna and a higher-frequency subantenna, the echo signal received by the higher-frequency subantenna may be down-mixed with the local oscillator signal, while the echo signal received by the lower-frequency subantenna may not require any down-mixing at all. By means of the down-mixing, e.g. a total bandwidth from 40 MHz to 3 GHz as in the above example may be achieved with an ADC having an input bandwidth of 1 GHz.

In an embodiment, the probe signal generator and the echo signal processor are, at least in part, implemented as a field programmable gate array (FPGA). Advantageously, on the part of the signal generator, the FPGA may be configured to generate the discrete frequency components $f_{n,k}$, in particular with defined amplitudes and phases. On the part of the echo signal processor, the FPGA advantageously is configured to perform the spectral analysis on the echo signal after sampling as well as the attribution of the $f'_{n,k}$ to the corresponding $f_{n,k}$ and the conjugation of the concerned frequency components, as described above. Further, the FPGA may be configured to perform a calibration of the retrieved frequency components, e.g. for antenna effects, and/or a spatial averaging, e.g. over multiple sweeps. Since the FPGA may be configured to perform the mentioned tasks efficiently, a high data acquisition speed is achieved. Further, an amount of data required for further processing, e.g. by a conventional SFCW algorithm, and transferred via an interface, e.g. to a remote computing device, is reduced.

GPR Array

In order to further increase the productivity of the data acquisition, in particular increase a lateral coverage, an array of antennas may be formed: In such embodiment, the transmit antenna comprises multiple transmit antennas, and the receive antenna comprises multiple receive antennas. The transmit and receive antennas may be arranged in a staggered grid transversal to a direction of data acquisition, in particular always one transmit antenna between neighbouring receive antennas. The device may then be configured to subsequently operate the multiple transmit and receive antennas e.g. in pairs of one transmit antenna and one receive antenna at a time, or one transmit antenna and two neighbouring receive antennas at a time.

Further, it is advantageous that at least two transmit antennas differ in polarization, and at least two receive antennas differ in polarization. In this way, the subsurface structure may be probed by electromagnetic waves of different polarity, e.g. horizontal (HH) and vertical (VV) or cross-polarization (HV, VH), which may lead to complementary information about the structure and ideally a more complete image of the structure. This is in particular useful in case of elongated, electrically conducting features in the structure, such as rebars or pipes.

Computer Program

A third aspect of the invention relates to a computer program comprising instructions that implement the above method. In particular, the computer program may comprise instructions that cause the above device to execute the steps of the above method.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1A:
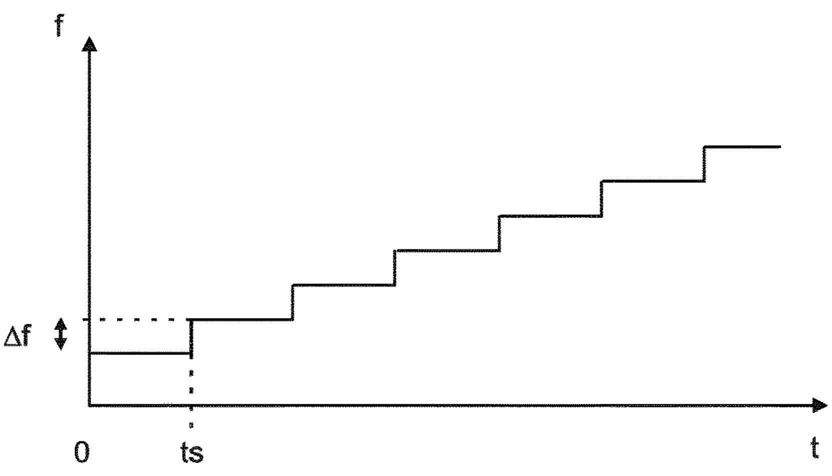
FIGS. 1*a*, 1*b* and 1*c* show schematic frequency vs. time diagrams of a conventional SFCW probe signal, an ultra-wideband probe signal and a ultra-wideband SFCW probe signals according to an embodiment of the invention, respectively.

FIG. 1*a* shows a sweep of frequencies over time as implemented in a conventional SFCW signal: A single-frequency probe signal is sent over a duration ts. Subsequently, the frequency of the probe signal is increased by frequency step Δf as described in the "Background Art" section.

Figure 1B:
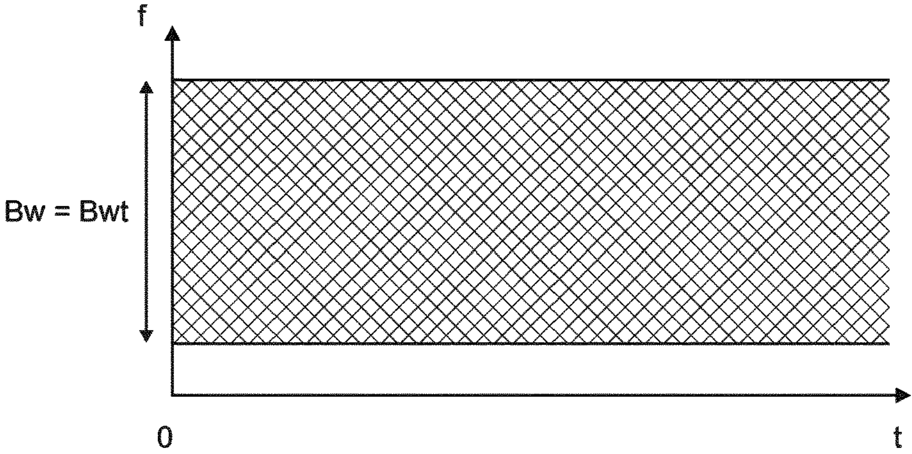

FIG. 1*b* shows a typical UWB signal with frequencies f spanning a bandwidth Bw in frequency space. The UWB signal may comprise a finite number of discrete frequency components, or it may comprise a continuous spectrum of frequencies in frequency space. If the UWB signal is not changing over time (as shown in FIG. 1*b*), the bandwidth Bw of the signal is equal to the total bandwidth Bwt. In accordance with a definition of the FCC, UWB may in particular be defined as an antenna transmission for which emitted signal bandwidth exceeds the lesser of 500 MHz or 20% of the arithmetic center frequency. It follows that in particular each signal with Bw>500 MHz is an UWB signal.

Figure 1C:
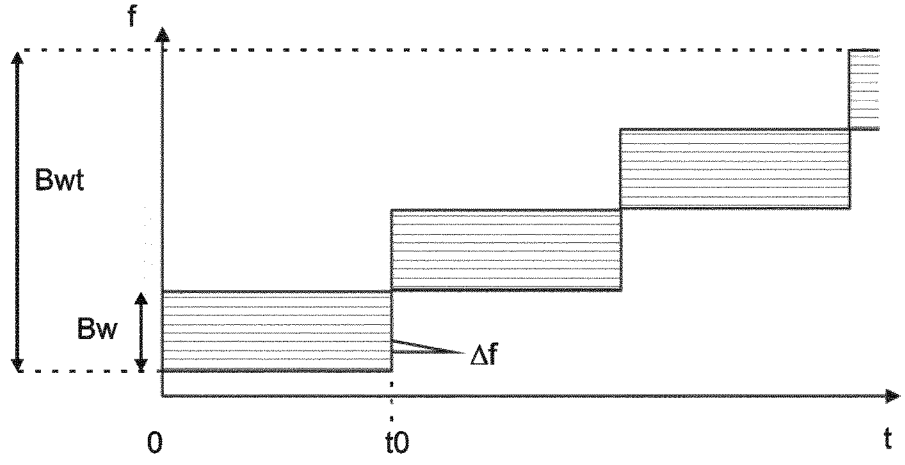

FIG. 1*c* shows a sweep of probe signals with a bandwidth Bw each while the sweep covers a total bandwidth Bwt. Each probe signal advantageously has the same duration t0. Further, each probe signal comprises multiple discrete frequency components $f_{n,k}$, in particular a finite number M of discrete frequency components $f_{n,k}$, which may in particular be separated by a frequency step Δf in frequency space.

Advantageously, the bandwidth Bw of each probe signal in the sweep is at least 500 MHz, i.e. each probe signal is a UWB signal. This has the advantages that a possible interference with telecommunication systems is minimized and that such signal is in accordance with regulatory limitations, in particular regulation of the FCC.

As an example, the bandwidth of each probe signal may be Bw=1 GHz. A first probe signal of the sweep may comprise frequency components between 400 and 1400 MHz, a second probe signal between 1400 and 2400 MHz, and a third probe signal between 2400 and 3400 MHz. In this example, the total bandwidth is Bwt=3 GHz. In general, the frequency ranges spanned by the frequency components $f_{n,k}$ in the subsequent probe signals may be overlapping or non-overlapping, in particular directly adjacent to each other, as in the above example and as depicted in FIG. 1*c*.

Further in the example, each probe signal may comprise M=240 discrete frequency components $f_{n,k}$. In case of equally spaced frequency components, the frequency step Δf is approximately 4 MHz. Such embodiment of a probe signal, in other words, facilitates sending M=240 frequency components, which, in a classical SFCW sweep as depicted in FIG. 1*a*, would be sent subsequently. This leads to a speed-up of the data acquisition, under the assumption of t0=ts, theoretically up to a factor M=240. This, in turn, means that the acquisition speed can be increased, e.g. up to velocities of a car or a drone in the range of 50 to 80 km/h, when compared to a classical SFCW method. A requirement, however, is that each discrete frequency component $f_{n,k}$ is unambiguously derivable from the probe signal such that no information, in particular no amplitude and/or phase information, is lost, also compared to a classical SFCW method.

The above requirement poses a challenge regarding the processing of the reflected signal received as echo signal from the structure. A large part of the processing of the echo signal, in particular deriving a quantity indicative of an amplitude and/or phase of each frequency component $f_{n,k}$, is conveniently performed in the digital domain. For transferring the received echo signal from analog to digital domain, i.e. digitizing the echo signal, sampling is applied, typically by an ADC. Conventional ADCs, however, are limited in their sampling frequency fs and analog input bandwidth. As an example, the maximum sampling frequency and analog input bandwidth of a conventional, in particular reasonably priced, ADC may be 250 MHz and 1 GHz, respectively. Via Nyquist's theorem, only frequency components up to fs/2, i.e. in the $1^{st}$ Nyquist zone, which in the example case is between 0 and 125 MHz, may be determined unambiguously from the echo signal sampled at fs. Evidently, a UWB signal cannot be digitized without losing information by such conventional ADC without taking further measures.

Such challenge is resolved by the following measures according to embodiments of the invention: Multiple discrete frequency components $f_{n,k}$ of the probe signal are distributed over different Nyquist zones, e.g. over Nyquist zones 1 to 4 as exemplified in FIG. 2. In the depicted embodiment, the discrete frequency components $f_{n,k}$ are equally spaced in frequency space separated by a frequency step Δf and have equal power. In general, the $f_{n,k}$ may have differing power and/or they may have unequal spacing. In particular, an amplitude of different $f_{n,k}$ may be adapted, e.g. in order to compensate for a frequency-dependent attenuation of the electromagnetic wave on its travel path through the structure. Also, a phase of different $f_{n,k}$ may be adapted. e.g. in order to reduce a ratio of peak power to average power in the probe signal.

Figure 2:
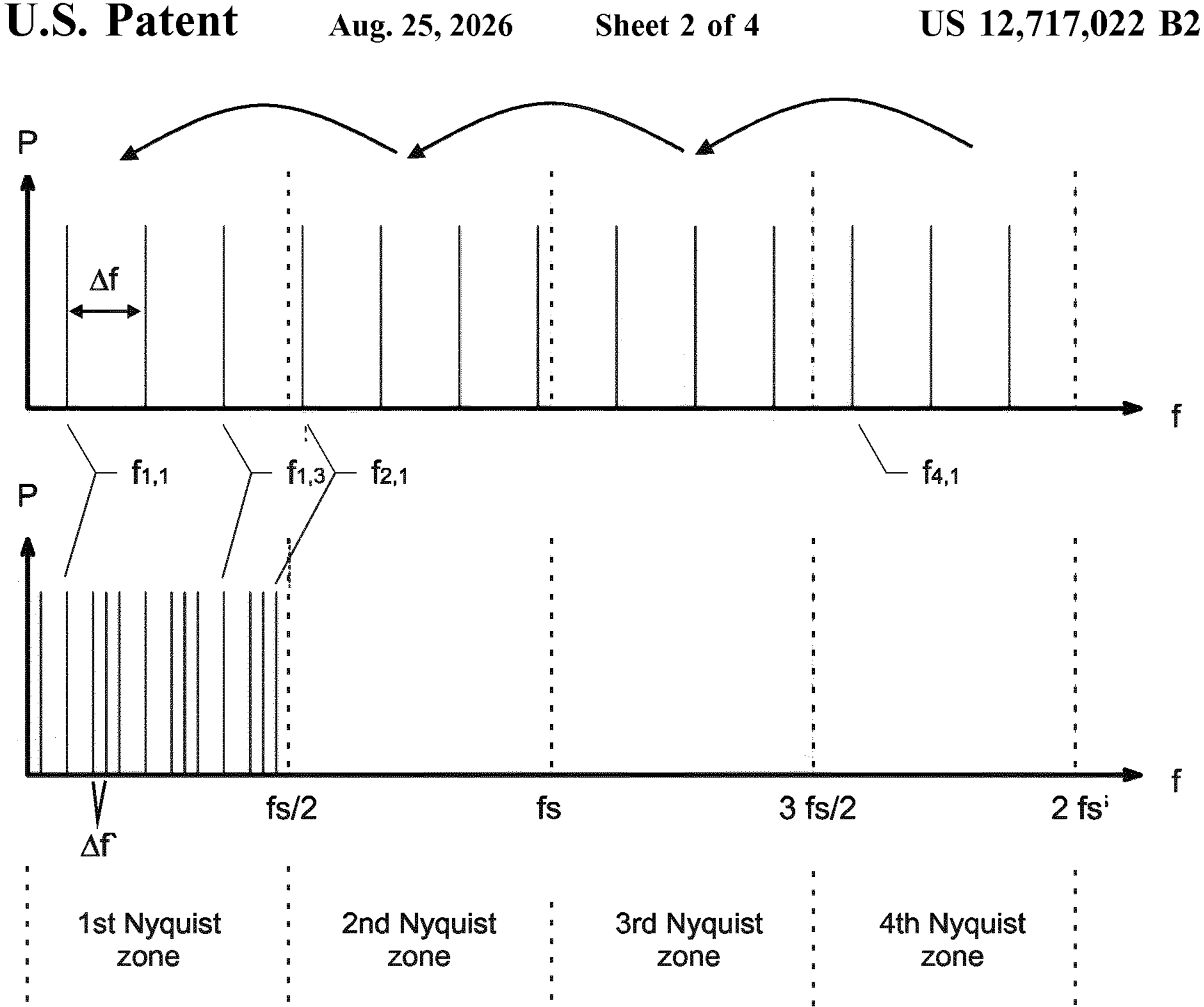
FIG. 2 shows schematic power vs. frequency diagrams of multiple discrete frequency components in the echo signal and folded frequency components after sampling according to an embodiment.

FIG. 2 shows 13 discrete frequency components $f_{n,k}$ of the probe signal, wherein n is the number of the Nyquist zone and k is the number of the frequency component in the n-th Nyquist zone. To be explicit, the probe signal of FIG. 2 comprises the frequency components $f_{1,1}$, $f_{1,2}$, $f_{1,3}$, $f_{2,1}$, $f_{2,2}$, $f_{2,3}$, $f_{2,4}$, $f_{3,1}$, $f_{3,2}$, $f_{3,3}$, $f_{4,1}$, $f_{4,2}$, $f_{4,3}$. After sampling at frequency fs, frequency components from higher Nyquist zones, i.e. n>1, are folded down to the $1^{st}$ Nyquist zone, as indicated by arrows in FIG. 2. The folded frequency components, after sampling, are located in the 1st Nyquist zone only, meaning that only $f_{1,k}$ do not change in frequency when sampled.

In the above example with fs=250 MHz and thus a 1st Nyquist zone between 0 and 125 MHz, this means that a frequency component at 130 MHz, after sampling, cannot be differentiated from a frequency component at 120 MHz. In general, the above given formula for the folded frequency components $f'_{n,k}$ applies. In order not to lose information, it is not desired that more than one $f_{n,k}$ fold onto the same frequency in the 1st Nyquist zone. In other words, the folded frequency components $f'_{n,k}$ need to be distinguishable. Then, the $f'_{n,k}$ may be unambiguously attributed to the original $f_{n,k}$ in the probe signal, e.g. by means of a table of the $f_{n,k}$ in the probe signal and their corresponding folded $f'_{n,k}$.

A further condition for choosing the frequency components $f_{n,k}$ and the sample frequency fs may be that any two folded frequency components $f'_{n,k}$ differ in frequency space by at least a minimum distance $\Delta f'$, see also the depiction of $\Delta f'$ in FIG. 2. This is due to the fact that a spectral analysis, e.g. a Fourier analysis, of the sampled echo signal may only be able to resolve frequency components separated by: at least $\Delta f'$ as distinct frequency components. In particular, only in that case, it may be possible to unambiguously determine an amplitude and/or phase of the $f_{n,k}$. Advantageous conditions on the $f_{n,k}$ or on $\Delta f'$ are given above.

In general, the discrete frequency components $f_{n,k}$ of the probe signal may be defined, e.g. by a numerical simulation, either empirically, by brute-force trial-and-error or based on an optimization. In a first step, a suitable ADC may be selected, e.g. the AD9683-250, thereby fixing an analog input bandwidth and a sampling frequency fs. In the above example of input bandwidth 1 GHz and fs=250 MHz, the $f_{n,k}$ in the probe signal may be distributed over eight Nyquist zones. In a second step, a minimum frequency distance $\Delta f'$ after sampling may be defined, e.g. based on a desired maximum probe signal duration t0, which is related to the acquisition speed. The defined $\Delta f'$ then gives a condition on the $f'_{n,k}$. In a third step, a number M of frequency components may be chosen, e.g. M=240. From the bandwidth Bw=1 GHz. and M, an initial frequency step $\Delta f^0$ of approximately 4 MHz may be derived for further optimization. Further, an initial frequency offset $f_O^0$, i.e. the frequency of $f_{1,1}$, may be chosen. By choosing $\Delta f^0$ and $f_O^0$, the $f_{n,k}$ are fixed. In a fourth step, the corresponding $f'_{n,k}$ may be calculated via the above formula, and it may be checked if the $f'_{n,k}$ fulfil the criterion of minimum frequency distance $\Delta f'$. If yes, the $f_{n,k}$ may be used as probe signal. If no, $\Delta f^0$ and/or $f_O^0$ may be varied in the third step, and the fourth step may be iterated with the varied value(s), and so on.

In general, a relation between $\Delta f'$ and $\Delta f$ is nonlinear, as can be understood from the above formula relating $f'_{n,k}$ to $f_{n,k}$. Hence, it may be necessary to search for suitable $f_{n,k}$ in a brute-force search over multiple iterations with variations of $\Delta f^0$ and/or $f_O^0$ as described above.

Figure 3:
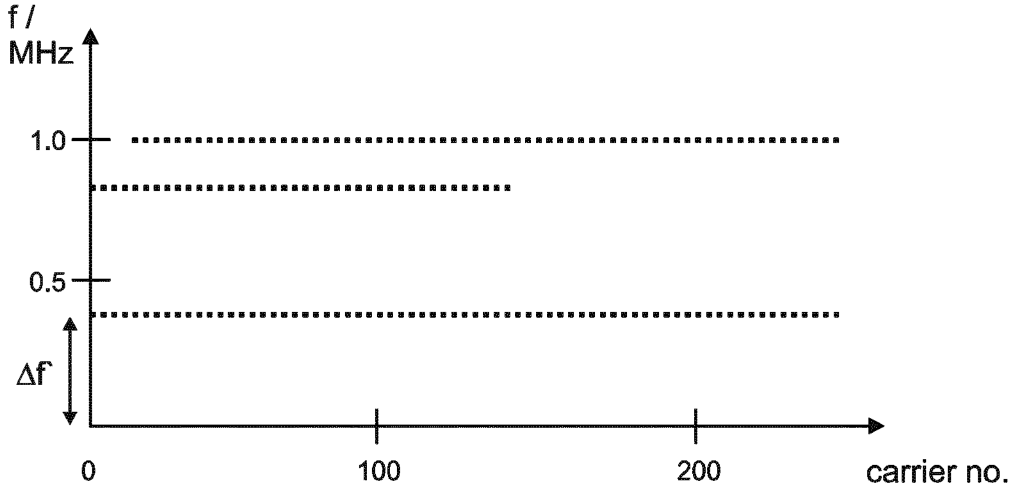
FIG. 3 shows a schematic plot of the frequency difference between folded frequency components and their neighbours (after folding) according to an embodiment.

FIG. 3 shows an example of a suitable set of M=240 frequency components $f_{n,k}$. On the ordinate, the diagram of FIG. 3 indicates, for each folded frequency component $f'_{n,k}$, the distance to its nearest next-higher neighbour. The minimum distance $\Delta f'$ between any two folded $f'_{n,k}$, in this case, is approximately 0.4 MHz. The underlying (unfolded) frequency components $f_{n,k}$ are determined by the parameters $f_O$=2 MHz and $\Delta f$=3.8 MHz, while the sampling frequency is fs=250 MHz.

Figure 4:
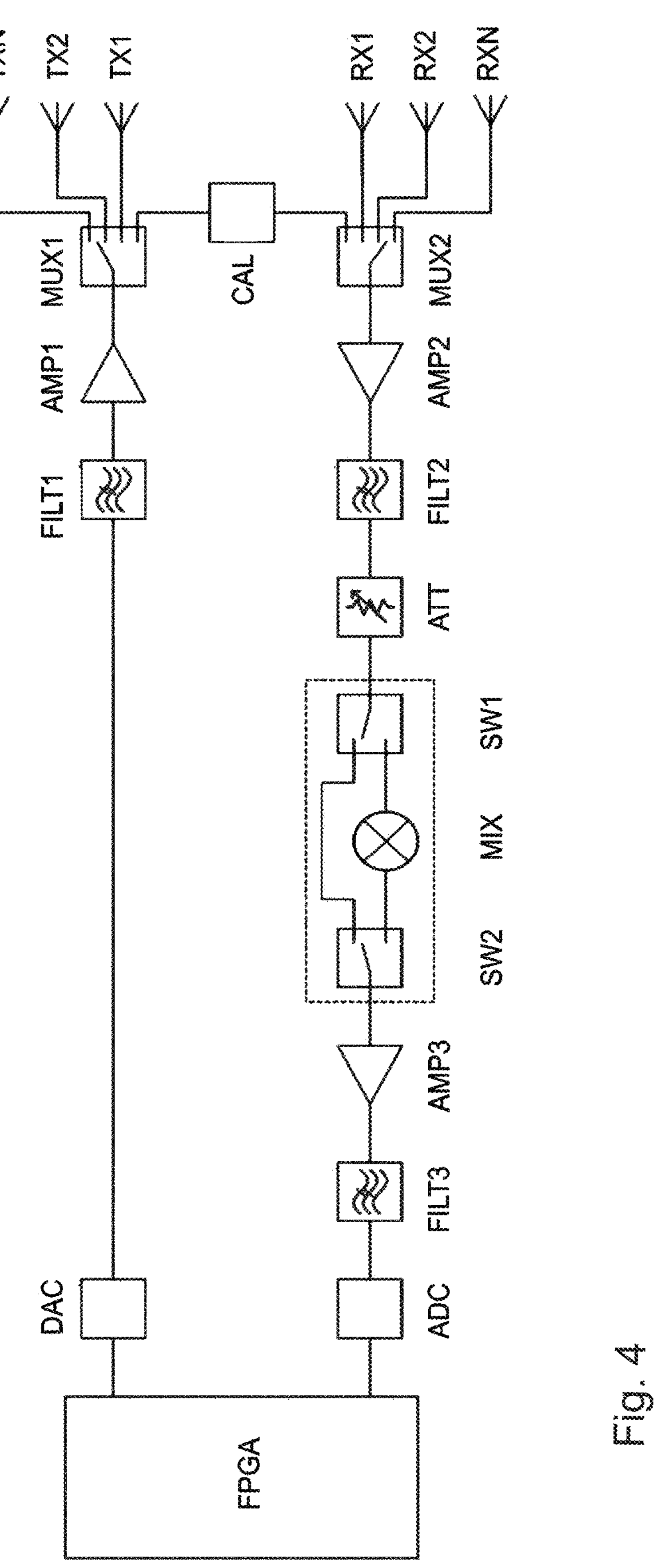
FIG. 4 shows a block diagram of a frontend of a device for probing a subsurface structure according to an embodiment.

FIG. 4 shows a block diagram of a frontend of a device for probing a subsurface structure according to an embodiment. The device is a GPR array comprising N transmit antennas, e.g. TX1, TX2, TX3 if N=3, and N receive antennas, e.g. RX1, RX2, RX3. In general, the device may comprise only one transmit and only one receive antenna, or it may comprise multiple transmit and receive antennas, e.g. in the range of 20 to 50. Also, the number of transmit antennas does not necessarily equal the number of receive antennas. The multiple transmit and receive antennas advantageously are laterally offset from each other, i.e. in a direction transversal to the acquisition direction. In this way, multiple measurement lines can be measured quasi-simultaneously by multiplexing over different transmit and receive antenna pairs TXn-RXn, e.g. by means of multiplexers MUX1 and MUX2.

Further, the device may comprise lower-frequency subantennas, e.g. RX1 and TX1, in particular wherein a center frequency of the lower-frequency subantenna is between 300 and 500 MHz. The device may comprise higher-frequency subantennas, e.g. RX2 and TX2, in particular wherein a center frequency of the higher-frequency subantenna is between 1 and 1.5 GHz. In this way, the device is suitable to transmit probe signals with a total bandwidth Bwt of at least 3 GHz.

For gaining more information about the subsurface structure, it is advantageous to use electromagnetic waves of different polarization. Thus, at least two transmit antennas differ in polarization, e.g. TX1 is horizontally polarized and TX3 is vertically polarized, and at least two receive antennas differ in polarization, e.g. RX1 horizontally polarized and RX3 is vertically polarized.

In the device of FIG. 4, the probe signal comprising the $f_{n,k}$ is generated by an FPGA and converted from digital to analog domain by a DAC, e.g. a AD9163 able to generate a signal bandwidth of up to 1 GHz within a range of up to 6 GHz. The DAC has an integrated numerically controlled oscillator (NCO) and mixer and is configured to generate probe signals over the total bandwidth Bwt of e.g. 3 GHz. The components on the transmit side, i.e. from FPGA to MUX1, together form the probe signal generator.

In contrast, the ADC. e.g. an AD9683-250, may have an input bandwidth of 1 GHz. Therefore, all frequencies above 1 GHz must be mixed down. For this purpose, a RX mixing stage is joined up in the circuit between the receive antennas RXN and the ADC. The RX mixing stage comprises a mixer MIX which is configured to down-mix the echo signal, e.g. from above 1 GHz to below 1 GHz.

In an advantageous embodiment (as shown in FIG. 4), the RX mixing stage comprises two switches SW1, SW2 in order to either send the echo signal via the mixer MIX or to shortcut the mixer MIX. For probe/echo signals with frequencies within the ADC's input bandwidth, the mixer MIX may be shortcut. This may in particular be the case for echo signals received by a lower-frequency subantenna. For probe/echo signals with frequencies above the ADC's input bandwidth, the echo signal may be down-mixed by the mixer MIX. This may in particular be the case for echo signals received by a higher-frequency subantenna.

The echo signal, which is digitized by the ADC, is further processed by the FPGA, as is described below with respect to FIG. 5. The components on the receive side, i.e. between MUX2 and FPGA, together form the echo signal processor.

According to FIG. 4, further electronic components may advantageously be present in the analog part of the device. On the transmitter side, i.e. between DAC and transmit antennas TXN, a first bandpass filter FILT1 and a first amplifier AMP1 may be configured to shape and amplify the probe signal. On the receiver side, i.e. between receive antennas RXN and ADC, a second (and third) amplifier AMP2 (AMP3) and a second (and third) bandpass filter FILT2 (FILT3) may do the same on the echo signal. Also, an adjustable attenuator ATT may be present between the receive antennas RXN and the mixer MIX, in particular between the second bandpass filter FILT2 and the mixer MIX. The attenuator ATT advantageously keeps a level of the echo signal constant. Further, a possibility to shortcut the transmit and receive antennas via a calibration path CAL between the multiplexers MUX1 and MUX2 facilitates to calibrate the antennas and in particular later on correct for antenna effects in the echo signal processing in the FPGA.

Figure 5:
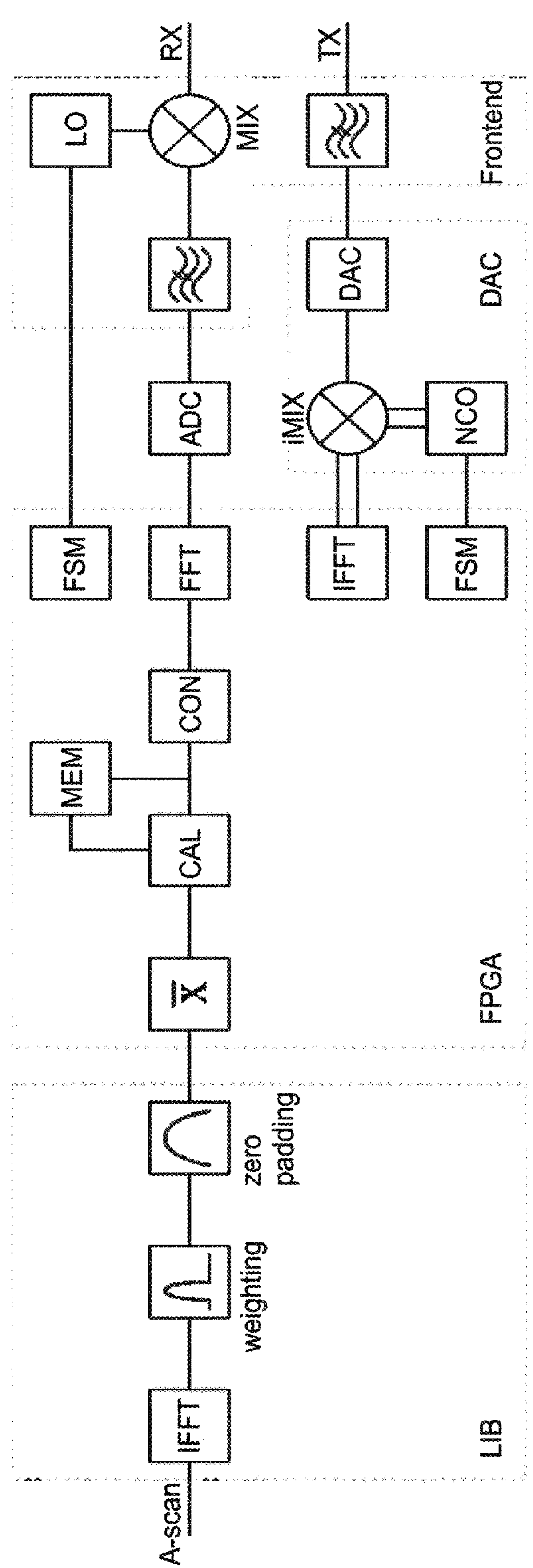
FIG. 5 shows a block diagram with components and functionality of a device according to an embodiment.

FIG. 5 shows a block diagram with components and functionality of a similar device. In particular, FIG. 5 illustrates different aspects of the device of FIG. 4. On the transmitter side leading to the transmit antenna(s) TX, the FPGA generates baseband discrete frequency components $f^b_{n,k}$ from corresponding amplitude and phase coefficients by an inverse fast Fourier transform IFFT. In particular, the amplitude and phase coefficients and the baseband discrete frequency components $f^b_{n,k}$ may be the same for all probe signals of a sweep. Depending on the frequency range of the probe signal, the baseband discrete frequency components $f^b_{n,k}$ are then up-mixed with a signal from an NCO by an integrated mixer iMIX of the DAC. The NCO is controlled by a finite state machine FSM, e.g. a counter, in the FPGA, which is configured to change the frequency of the signal of the NCO such that a sweep of subsequent probe signals is produced, e.g. as schematically illustrated in FIG. 1*c*.

On the receive side of the device of FIG. 5, the mixer MIX is configured to down-mix the echo signal from the receive antenna RX with a local oscillator signal generated by a local oscillator LO. The LO is, again, controlled by a finite state machine FSM in the FPGA. In particular, the FSM on the receive side and the FSM on the transmit side are synchronized. The FSM on the receive side is configured to down-mix the echo signal to a baseband frequency range, in particular corresponding to the baseband frequency components $f^b_{n,k}$, which is within the input bandwidth of the ADC.

On the digitized echo signal (after the ADC), further processing is performed in the FPGA. In general, the further echo signal processing may, at least in part, also be performed on a central processing unit CPU, which may in particular be a CPU of a remote device, e.g. of a personal computer, a laptop or a tablet computer. In the block diagram of FIG. 5, the functionality of the blocks summarized as library LIB is performed on the CPU. An interface between FPGA of the device and the CPU of the remote device might be implemented via a wireless connection. The distribution of the different functionality onto FPGA and CPU may, in general, also be different than depicted in FIG. 5. Advantageously, an amount of data derived from the echo signal is reduced by the processing on the FPGA, i.e. in particular before the data is transmitted to the CPU, e.g. on a remote device.

As a first step of the digital signal processing, in particular on the FPGA, a fast Fourier transform FFT or similar spectral analysis is performed on the echo signal. As a result, a (complex valued) quantity indicative of amplitude and phase of each $f'_{n,k}$ is retrieved. As a second step, the $f'_{n,k}$ are attributed to the $f_{n,k}$ in the probe signal, and the quantity indicative of amplitude and phase is conjugated (symbol CON in FIG. 5) for each $f_{n,k}$ with even-numbered n, as described above in section "Processing the echo signal". As a third step, calibration data may be loaded from a memory MEM and used to calibrate the quantity indicative of amplitude and phase of the $f_{n,k}$ (symbol CAL in FIG. 5). The calibration data may e.g. relate to an antenna calibration as depicted by symbol CAL in FIG. 4. As a fourth step, spatial averaging (symbol $\overline{X}$ in FIG. 5) is performed, thereby increasing the signal-to-noise ratio (SNR).

The further steps of weighting, zero padding and performing an inverse fast Fourier transform (IFFT), which may in particular be performed on the CPU, are the same as for conventional SFCW methods. A description of these steps is e.g. given in WO 2018161183 A1. As a result, a conventional A-scan is received, wherein the A-scan, due to the bandwidth covered by the different $f_{n,k}$ and the sweep of probe signals, has a large penetration depth, good depth resolution and high SNR at the same time.

By the specific properties of the probe signals, in particular of the discrete frequency components $f_{n,k}$, as described above, the acquisition speed of a GPR survey may be significantly increased, while the advantageous of conventional SFCW methods as described above are kept. In particular, an acquisition speed of at least 80 km/h is reached at a spatial resolution of 50 mm or better, or for the higher-frequency subantenna, even 25 mm or better.

The invention claimed is:

1. A method for probing a subsurface structure, comprising:

(a) sending a probe signal as an electromagnetic wave into the structure, (b) receiving an echo signal of the electromagnetic wave from the structure, (c) processing the echo signal for deriving information about the structure, wherein the processing the echo signal comprises sampling the echo signal at a sampling frequency ($f_s$), wherein the probe signal comprises multiple discrete frequency components ($f_{n,k}$), wherein at least two of the multiple frequency components ($f_{n,k}$) are located in different Nyquist zones, wherein an n-th Nyquist zone covers a frequency range from $(n-1)*f_s/2$ to $n*f_s/2$ with $f_s$ being the sampling frequency and n=1, 2, . . . , wherein k=1 . . . K and K is the number of frequency components ($f_{n,k}$) in the n-th Nyquist zone.

2. The method of claim 1, wherein the frequency components ($f_{n,k}$) in the n-th Nyquist zone fold onto folded frequency components ($f'_{n,k}$) in the $1^{st}$ Nyquist zone, wherein $$f'_{n,k} = \begin{cases} f_{n,k}\mathrm{mod}(f_s/2), & n \text{ odd} \\ f_s/2 - f_{n,k}\mathrm{mod}(f_s/2), & n \text{ even} \end{cases}$$

wherein the discrete frequency components ($f_{n,k}$) are such that for all n and k, the folded frequency components ($f'_{n,k}$) differ from each other, wherein the frequency components ($f_{n,k}$) are equally spaced in frequency space.

3. The method of claim 1, wherein K>1 for at least one Nyquist zone with n=1 . . . N with N being at least 2.

4. The method of claim 1, wherein the discrete frequency components ($f_{n,k}$) are located in Nyquist zones up to the N-th Nyquist zone, wherein N>2.

5. The method of claim 2, wherein the discrete frequency components ($f_{n,k}$) are such that for all n and k, the folded frequency components ($f'_{n,k}$) have a minimum distance to each other which is at least $1/t_0$ with $t_0$ being a duration of the probe signal.

6. The method of claim 2, wherein the discrete frequency components ($f_{n,k}$) are such that for all n and k, the folded frequency components ($f'_{n,k}$) have a minimum distance to each other which is at least 0.1 MHz.

7. The method of claim 1, wherein the probe signal comprises at least M discrete frequency components ($f_{n,k}$), wherein M is at least 10, and/or wherein the discrete frequency components ($f_{n,k}$) are such that for all n and k, the folded frequency components ($f'_{n,k}$) have a minimum distance to each other which is at least $f_s/(4*M)$.

8. The method of claim 1, wherein all frequency components in the probe signal other than the multiple discrete frequency components ($f_{n,k}$) are zero.

9. The method of claim 1, wherein the multiple discrete frequency components ($f_{n,k}$) span a bandwidth of the probe signal, wherein the bandwidth of the probe signal is wider than a Nyquist zone.

10. The method of claim 1, wherein the sampling frequency ($f_s$) is between 100 and 500 MHz.

11. The method of claim 1, wherein the processing the echo signal comprises performing a spectral analysis of the echo signal.

12. The method of claim 1, wherein the processing the echo signal comprises determining a quantity indicative of an amplitude and/or a phase of each of the folded frequency components $f'_{n,k}$ in the echo signal, wherein the processing the echo signal comprises attributing the folded frequency components ($f'_{n,k}$) to the corresponding discrete frequency components ($f_{n,k}$), and/or wherein the processing the echo signal comprises conjugating the quantity indicative of an amplitude and/or a phase for frequency components ($f_{n,k}$) with even-numbered n.

13. The method of claim 1, wherein an initial phase shift of at least two of the discrete frequency components ($f_{n,k}$) is such that a maximum amplitude of the probe signal is smaller by at least 10% than a maximum amplitude of a hypothetic probe signal with the same discrete frequency components ($f_{n,k}$) but zero initial phase shift of the discrete frequency components ($f_{n,k}$).

14. The method of claim 1, wherein the sending the probe signal, the receiving the echo signal and the processing the echo signal are iterated with varying discrete frequency components ($f_{n,k}$) in the probe signal, wherein between subsequent iterations, the discrete frequency components ($f_{n,k}$) in the probe signal are shifted by a frequency offset, wherein the frequency offset is equal to or larger than the bandwidth.

15. The method of claim 14, wherein the processing the echo signal, at least for part of the subsequent probe signals, comprises down-mixing the echo signal with a local oscillator signal, before performing the spectral analysis of the echo signal.

16. A device for probing a subsurface structure comprising a probe signal generator configured to generate a probe signal, a transmit antenna configured to send the probe signal as an electromagnetic wave into the structure, a receive antenna configured to receive an echo signal of the electromagnetic wave from the structure, an echo signal processor configured to process the echo signal for deriving information about the structure, wherein the device is configured to carry out the method of claim 1.

17. The device of claim 16, wherein the transmit antenna and the receive antenna each comprise a lower-frequency subantenna and a higher-frequency subantenna, wherein a center frequency of the lower-frequency subantenna is between 300 and 500 MHz, and/or wherein a center frequency of the higher-frequency subantenna is between 1 and 1.5 GHz.

18. The device of claim 16, wherein the probe signal generator comprises a digital signal generator and a digital-to-analog converter.

19. The device of claim 16, wherein the probe signal generator is configured to generate a probe signal comprising multiple discrete frequency components, wherein a frequency resolution of the probe signal generator is 0.1 MHz or less.

20. The device of claim 16, wherein the probe signal generator and the echo signal processor are, at least in part, implemented as a field programmable gate array.

21. The device of claim 16, wherein the echo signal processor comprises an analog part, a digital part and an analog-to-digital converter configured to sample the echo signal at a sampling frequency, wherein the sampling frequency is smaller than two times the bandwidth of the probe signal, and/or wherein the echo signal processor, in the analog part, comprises a local oscillator and a down-mixer configured to down-mix the echo signal with a local oscillator signal from the local oscillator, wherein the local oscillator comprises at least two switchable analog oscillators.

22. The device of claim 16, wherein the transmit antenna comprises multiple transmit antennas, wherein the receive antenna comprises multiple receive antennas, wherein the device is configured to subsequently operate the multiple transmit and receive antennas in pairs of one transmit antenna and one receive antenna at a time, wherein at least two transmit antennas differ in polarization, and/or wherein at least two receive antennas differ in polarization.

23. A non-transitory computer-readable medium with instructions stored thereon, that when executed by a processor, cause the device of claim 16 to perform a method comprising:

sending a probe signal as an electromagnetic wave into the structure, receiving an echo signal of the electromagnetic wave from the structure, and processing the echo signal for deriving information about the structure, wherein the processing the echo signal comprises sampling the echo signal at a sampling frequency (fs), wherein the probe signal comprises multiple discrete frequency components (fn,k), wherein at least two of the multiple frequency components (fn,k) are located in different Nyquist zones, wherein an n-th Nyquist zone covers a frequency range from (n−1)*fs/2 to n*fs/2 with fs being the sampling frequency and n=1, 2, . . . , wherein k=1 . . . K and K is the number of frequency components (fn,k) in the n-th Nyquist zone.

* * * * *